United States Patent Office 2,738,371
Patented Mar. 13, 1956

2,738,371

PURIFICATION OF FLUOROCARBONS

Howard Maurice Parmelee, Woodstown, N. J., assignor to E. I. du Pont de Nemours and Company, Wilmington, Del., a corporation of Delaware No Drawing. Application February 14, 1951,
Serial No. 210,994

10 Claims. (Cl. 260—648)

This invention relates to the purification of fluorocarbons and more particularly to the removal from such compounds of saturated highly fluorinated compounds which contain hydrogen.

The fluorocarbons, i. e., compounds composed exclusively of carbon and fluorine, are extremely inert substances which are characterized by great thermal stability and by resistance to chemical action. They cannot be oxidized and resist the action of even such drastic reagents as the alkali metals up to relatively high temperatures. These properties make them eminently suitable for use in many applications, such as in fire extinguishers, as heat transfer and dielectric media, as high temperature lubricants, and the like.

Fluorocarbons are ordinarily prepared either by the reaction between hydrocarbons and fluorinating agents such as cobaltic trifluoride, manganese trifluoride or silver difluoride, or by the direct reaction between hydrocarbons and fluorine in the presence of a silver fluoride catalyst. The fluorocarbon is then scrubbed with caustic soda solution to remove excess hydrofluoric acid. When prepared in this manner, the fluorocarbons usually contain a small amount of incompletely fluorinated material. The presence of these hydrogen-containing fluorocarbons is shown by irregularities in the boiling point curve, by high values of the dielectric constant, by infrared measurements and by chemical analysis according to the method described in Analytic Chemistry 11, 146 (1947). It is possible to reduce the amount of the incompletely fluorinated compounds by further contact with the original fluorinating agent, but even after repeated treatments some hydrofluorocarbons usually remain. In some cases they may be removed by careful fractional distillation. This is not possible, however, where the feed material comprises a mixture of hydrocarbons as in the case of petroleum fractions or where cracking and reforming take place during the fluorination.

The incompletely fluorinated compounds which are present after repeated fluorination treatments are believed to contain one or two hydrogen atoms per molecule. The compounds containing one hydrogen atom may be formulated as $C_mF_{2m+1}.CHF.C_nF_{2n+1}$. Even when present in small amount so that the hydrogen content of the fluorocarbon mixture is less than 0.1 percent, these hydrofluorocarbons cause the mixture to be slightly corrosive so as to preclude the use of the fluorocarbons in some of the applications for which they should theoretically be ideally suited. Some metals are slowly corroded by the impure fluorocarbons. When strong alkaline solutions come in contact with the hydrogen-containing fluorocarbons, a certain amount of darkening takes place which is attributable to reaction between the hydrofluorocarbons and the alkali.

No practical chemical method of removing these impurities has been known heretofore. Their general inertness is shown by the fact that according to Grosse and Cady in Industrial and Engineering Chemistry 39, 367 (1947) the compound $C_7F_{12.7}H_{3.3}$ reacts with 40 percent potassium hydroxide solution only after heating for 45 hours at 90° C.

It is an object of this invention to provide fluorocarbons having a hydrogen content of 0.01 percent or less. A further object is to provide a method for decreasing the hydrogen content of fluorocarbons and particularly of mixtures of fluorocarbons. A still further object is to provide a purification method which is relatively rapid and which does not require elaborate equipment. Still other objects will appear from the following description.

These objects are accomplished by contacting impure fluorocarbons, and particularly saturated acyclic and alicyclic fluorocarbons of 5 to 25 carbon atoms containing up to 0.1 percent of hydrogen, present in highly fluorinated saturated fluorohydrocarbons, with a substantially anhydrous nitrogen-containing basic compound from the class consisting of ammonia and amines, and thereafter separating the fluorocarbon from the mixture. Particularly useful in the practice of this invention are the saturated primary and secondary aliphatic monoamines and diamines normally boiling above 25° C. and containing no more than 10 carbon atoms.

The method of carrying out the purification is illustrated by the following examples:

Example 1

100 grams of a fluorinated oil, boiling in the range from 49° to 130° C. at 10 mm. Hg pressure and containing 0.024 percent hydrogen is refluxed with 100 ml. of mono-n-butylamine for thirty minutes. When allowed to settle, the reaction mixture comprises a light-colored fluorocarbon layer, a dark brown amine layer, and some crystals. The crystals are removed by filtration and are washed with 25 ml. of butylamine. The washings are added to the liquid mixture. The fluorocarbon layer is further extracted with butylamine until it displays only a faint amber color after refluxing for thirty minutes with butylamine. It is then washed once with distilled water, twice with 250 ml. of 10 percent sulfuric acid, once with 5 percent aqueous sodium carbonate solution and finally with distilled water. It is then dried over anhydrous calcium chloride and is distilled at 4 mm. pressure. The purified matter contains 0.01 percent hydrogen as determined from its infrared absorption spectrum.

Example 2

25 ml. of perfluorodimethylcyclohexane containing 0.035 percent hydrogen are shaken with 25 ml. of mono-n-butylamine. The solution becomes warm and dark brown in color and crystals form. The solution is allowed to stand overnight at room temperature. Ten ml. of water are added, which causes the crystals to dissolve. The fluorocarbon layer is then separated by gravity and washed in a separatory funnel, first with water and then with 50 ml. of 50 percent sulfuric acid. The fluorocarbon layer is then distilled from 80 percent sulfuric acid and is dried over anhydrous calcium chloride. It contains 0.005 percent hydrogen.

A control sample of the same impure perfluorodimethylcyclohexane treated in the same manner, i. e., by washing and distillation, but without the treatment with butylamine, is not appreciably improved. It contains essentially the same hydrogen content as the untreated starting material.

Example 3

25 ml. of perfluorodimethylcyclohexane are treated with 25 ml. of dibutylamine by the procedure described in Example 2. The hydrogen content of the purified product is 0.005 percent as compared with 0.035 percent for the starting material.

Example 4

25 ml. of perfluorodimethylcyclohexane are treated with 25 ml. of diethylamine by the procedure described in Example 2. The hydrogen content of the purified product is 0.004 percent as compared with 0.035 percent for the starting material.

Example 5

25 ml. of perfluorodimethylcyclohexane containing 0.035 percent hydrogen are shaken with 25 ml. of ethylenediamine. After standing overnight at room temperature, the reaction mixture contains a light colored fluorocarbon layer, a red amine layer, some crystals and in addition some water-insoluble solids. The fluorocarbon layer is separated by gravity and washed with water and then with 50 percent sulfuric acid. It is then distilled from 80 percent sulfuric acid and dried over anhydrous calcium chloride. The resulting product contains 0.004 percent hydrogen.

Example 6

25 ml. of perfluorodimethylcyclohexane are shaken with 25 ml. of hexamethylenediamine. After standing overnight at room temperature, the mixture contains a red insoluble solid as well as some water-soluble crystals. The amine layer is brown. The fluorocarbon layer is washed and distilled as described in the preceding examples. The purified product contains 0.004 percent hydrogen.

Example 7

25 ml. of a sample of perfluoro-n-heptane containing 0.039% hydrogen are shaken with 25 ml. of mono-n-butylamine. The mixture grows warm. After standing overnight at room temperature, the reaction mixture separates into two layers and crystals are formed. A few ml. of water are added to dissolve the crystals. The fluorocarbon layer is separated, washed with water and with 50 percent sulfuric acid and then distilled from 80 percent sulfuric acid. The purified perfluoro-n-heptane contains 0.01 percent hydrogen.

The fluorocarbons which may be purified by the process of this invention includes saturated acyclic and alicyclic fluorocarbons containing from 5 to 25 carbon atoms and containing, as impurities, incompletely fluorinated saturated fluorohydrocarbons in such amount as to bring the total hydrogen content to 0.1 percent or less. Examples of such fluorocarbons are perfluoro-n-heptane, perfluoromethylhexane, perfluorodimethylpentane, perfluoro-2,2,3-trimethylbutane, perfluoro-2,2,4-trimethylpentane, perfluorohexadecane, perfluorotetraisobutane, perfluorotetracosane, perfluorocyclopentane, perfluoroclohexane, perfluoromethylcyclohexane, perfluorodimethylcyclohexane, perfluoro-1,3,5-trimethylcyclohexane, perfluoronaphthalane, perfluoro-1-methylnaphthalane perfluoroanthracane and perfluorophenanthrane.

Purification according to this invention may be effected by contacting the fluorocarbon with any substantially anhydrous nitrogen-containing basic compound from the class consisting of ammonia and amines, although the most satisfactory results are obtained by use of a primary or secondary amine. As a matter of convenience it is preferable to employ those primary and secondary amines normally boiling above 25° C., that is, at atmospheric pressure, and containing no more than 10 carbon atoms. This group of amines includes the mono-n-alkylamines starting with propylamine and including butylamine, amylamine, hexylamine, heptylamine, octylamine, nonylamine and decylamine. It also includes the lower dialkylamines beginning with methylethylamine, and the lower diamines such as ethylenediamine, propylenediamine and hexamethylenediamine. Mono-n-butylamine and di(n-butyl) amine are preferred agents.

Anhydrous ammonia and the primary and secondary amines which normally boil below 25° C., namely monomethylamine, monoethylamine and dimethylamine, are effective purifying agents but are somewhat more difficult to use. One method of employing these compounds is to bubble the gaseous amine through the liquid fluorocarbon, which may be heated to increase the speed of the reaction. Another method of treatment which is advantageous in some cases is to contact the fluorocarbon with the gaseous ammonia or amine under superatmospheric pressure in suitable equipment.

Although tertiary amines such as tributylamine and diethylcyclohexylamine, heterocyclic amines such as pyridine, and aromatic amines such as aniline exert some purifying effect, they are less effective than the primary and secondary aliphatic amines. It is necessary that the ammonia or the amine be in substantially anhydrous condition. Aqueous solutions are ineffective.

In general it is preferred to use amounts of the amine corresponding to 0.25 to 1.0 parts by weight for each part of fluorocarbon to be treated. Smaller amounts of treating agent frequently fail to produce adequate removal of the fluorohydrocarbons. On the other hand, in order to make the process economically attractive, it is usually necessary to recover the excess amine after treatment and for this reason it is desirable to avoid the use of unduly large amounts.

The purification treatment may be carried out at temperatures between 20° and 150° C. or in some cases at even higher temperatures. Temperatures below 20° C., are operable in some cases but the rate of reaction will usually be undesirably slow. Temperatures above 150° C. have in no case been found to be necessary and there is some danger as the temperature increases that the completely fluorinated compounds may be attacked to some slight extent. The treatment may be conducted at pressures either above or below atmospheric, although it will usually be more convenient to operate at atmospheric pressure except when a low boiling amine or ammonia is used. No special method of adding the amine need be employed. It is usually desirable to supply agitation to the reaction mixture in order to secure proper contact between the treating agent and the fluorocarbon. When the amine has a sufficiently low boiling point, as with monobutylamine, a convenient method of operation is to achieve the desired amount of agitation by maintaining the mixture under reflux until reaction is complete.

After the amine has reacted completely with the hydrofluorocarbons present, crystals of ammonium fluoride or of amine hydrofluorides are usually present. It is believed that these compounds are formed by the following reactions:

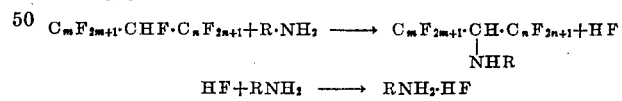

$$HF + RNH_2 \longrightarrow RNH_2 \cdot HF$$

The crystals may usually be dissolved by adding a small amount of water. The fluorocarbon layer is then separated by gravity and may be further purified in several different ways. One method is to wash it repeatedly with a material which acts as a solvent for the reaction products between the amine and the incompletely fluorinated fluorocarbons. This extraction solvent may consist of the amine which was used as the original treating agent or it may be a low boiling organic solvent such as methanol, ethanol, acetone, ethylcyclohexane, ethylacetate, 2-aminoethanol, 2-nitropropane and other related compounds. Another method of removing amines and amine salts is to wash with water and then with sulfuric acid in amounts sufficient to react with the amino groups which are present. When this is done the sulfates and excess sulfuric acid may be removed by washing with water followed by aqueous alkali solutions. It is also possible to recover the fluorocarbon by distilling it from a solution of sulfuric acid. In this distillation the amines and amine salts are bound by the sulfuric acid and do not distill over with the fluorocarbon.

Fluorocarbons which have been treated in accordance with this invention usually contain a maximum of 0.01 percent hydrogen and are essentially free from the slight degree of corrosiveness which is encountered with fluorocarbons which have not been subjected to this treatment. The purified products may be used in a wider variety of materials of construction and under more drastic conditions of temperature and pressure.

I claim:

1. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with a substantially anhydrous nitrogen-containing basic compound from the class consisting of ammonia and amines, and thereafter separating the fluorocarbon from the said basic compound and from the products of reaction of the said basic compound with the said fluorohydrocarbons.

2. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with from 0.25 to 1 part by weight per part of fluorocarbon of a substantially anhydrous nitrogen-containing basic compound from the class consisting of ammonia and amines, and thereafter separating the fluorocarbon from the said basic compound and from the products of reaction of the said basic compound with the said fluorohydrocarbons.

3. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with a substantially anhydrous saturated amine normally boiling above 25° C. and containing no more than 10 carbon atoms, and thereafter separating the fluorocarbon from the said basic compound and from the products of reaction of the said basic compound with the said fluorohydrocarbons.

4. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with from 0.25 to 1 part by weight per part of fluorocarbon of a substantially anhydrous saturated amine normally boiling above 25° C. and containing no more than 10 carbon atoms, and thereafter separating the fluorocarbon from the said basic compound and from the products of reaction of the said basic compound with the said fluorohydrocarbons.

5. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with a substantially anhydrous saturated amine normally boiling above 25° C. and containing no more than 10 carbon atoms, and thereafter separating the products of reaction from the fluorocarbon by extracting with a solvent.

6. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with a substantially anhydrous saturated amine normally boiling above 25° C. and containing no more than 10 carbon atoms, adding sulfuric acid in amount sufficient to react with the amino groups present, and separating the fluorocarbon from the mixture.

7. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with substantially anhydrous mono-n-butylamine and thereafter separating the fluorocarbon from the said basic compound and from the products of reaction of the said basic compound with the said fluorohydrocarbons.

8. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with substantially anhydrous di(n-butyl) amine and thereafter separating the fluorocarbon from the said basic compound and from the products of reaction of the said basic compound with the said fluorohydrocarbons.

9. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. with substantially anhydrous ammonia, and thereafter separating the fluorocarbon from the said basic compound and from the products of reaction of the said basic compound with the said fluorohydrocarbons.

10. A process of decreasing the hydrogen content of saturated fluorocarbons of 5 to 25 carbon atoms containing up to 0.1 percent of hydrogen, present in highly fluorinated saturated fluorohydrocarbons, which comprises contacting the fluorocarbon at a temperature between 20° and 150° C. under superatmospheric pressure with substantially anhydrous ammonia, and thereafter separating the fluorocarbon from the said basic compound and from the products of reaction of the said basic compound with the said fluorohydrocarbons.

References Cited in the file of this patent

UNITED STATES PATENTS

| Number | Name | Date |
|---|---|---|
| 1,946,195 | Daudt | Feb. 6, 1934 |
| 1,946,199 | Dunphy | Feb. 6, 1934 |
| 2,119,149 | Bishop | May 31, 1938 |
| 2,558,624 | Murray | June 26, 1951 |